(12) United States Patent
Arai

(10) Patent No.: US 10,970,063 B2
(45) Date of Patent: Apr. 6, 2021

(54) RELAY APPARATUS, TRANSFER METHOD, AND COMPUTER PROGRAM

(71) Applicant: Sumitomo Electric Industries, Ltd., Osaka (JP)

(72) Inventor: Koji Arai, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/604,209

(22) PCT Filed: Jan. 18, 2018

(86) PCT No.: PCT/JP2018/001410
§ 371 (c)(1),
(2) Date: Oct. 10, 2019

(87) PCT Pub. No.: WO2018/189975
PCT Pub. Date: Oct. 18, 2018

(65) Prior Publication Data
US 2020/0034140 A1 Jan. 30, 2020

(30) Foreign Application Priority Data

Apr. 12, 2017 (JP) .............................. JP2017-078837

(51) Int. Cl.
*G06F 8/656* (2018.01)
*B60R 16/023* (2006.01)
(Continued)

(52) U.S. Cl.
CPC ............ *G06F 8/656* (2018.02); *B60R 16/023* (2013.01); *G06F 9/445* (2013.01); *H04L 67/34* (2013.01)

(58) Field of Classification Search
CPC . G06F 8/65; G06F 8/656; G06F 9/445; G06F 13/00; B60R 16/023; H04L 12/46; H04L 67/34
See application file for complete search history.

(56) References Cited

U.S. PATENT DOCUMENTS 8,290,659 B2 * 10/2012 Asano .................... G08G 1/092
701/31.4
9,904,531 B2 * 2/2018 Suzuki ...................... G06F 8/65
(Continued)

FOREIGN PATENT DOCUMENTS

DE 102012023648 B4 * 9/2016 ........ B60W 50/0098
JP 2015-037938 A 2/2015
(Continued)

OTHER PUBLICATIONS

Chowdhury et al. "Dynamic Vehicle Dispatching at the Intermodal Transfer Station", Jan. 2001, Transportation Research Record (Year: 2001).*
(Continued)

*Primary Examiner* — Wei Y Zhen
*Assistant Examiner* — Junchun Wu
(74) *Attorney, Agent, or Firm* — Baker Botts L.L.P.; Michael A. Sartori

(57) ABSTRACT

Provided is a relay apparatus configured to transfer an update program, which is downloaded from a server, for a control program of an on-vehicle control device to the on-vehicle control device. The relay apparatus includes: a calculation unit configured to calculate an index value indicating a proportion between a size of the control program and a size of the update program; and a transfer control unit configured to determine whether or not to permit the transfer, on the basis of the calculated index value.

7 Claims, 7 Drawing Sheets

(51) Int. Cl.
*G06F 9/445* (2018.01)
*H04L 29/08* (2006.01)

(56) References Cited

U.S. PATENT DOCUMENTS

| | | | | |
|---|---|---|---|---|
| 2006/0085609 | A1* | 4/2006 | Ninose | G06F 11/2082 711/162 |
| 2009/0320013 | A1* | 12/2009 | Maeda | G06F 8/65 717/168 |
| 2012/0226832 | A1* | 9/2012 | Niino | G06F 3/061 710/33 |
| 2012/0290781 | A1* | 11/2012 | Seo | G06F 12/0246 711/104 |
| 2013/0275578 | A1* | 10/2013 | Williams | H04L 47/822 709/224 |
| 2013/0332916 | A1* | 12/2013 | Chinn | G06F 9/44 717/169 |
| 2013/0339721 | A1* | 12/2013 | Yasuda | G07C 5/008 713/100 |
| 2014/0325500 | A1* | 10/2014 | Jang | G06F 8/65 717/173 |
| 2014/0380299 | A1* | 12/2014 | Nakamura | H04N 7/147 717/173 |
| 2015/0023167 | A1* | 1/2015 | Tong | H04L 1/1854 370/230 |
| 2015/0149989 | A1* | 5/2015 | Lu | G06F 8/65 717/170 |
| 2015/0178070 | A1* | 6/2015 | Doi | H04W 4/50 717/172 |
| 2015/0220321 | A1* | 8/2015 | Jung | G06F 8/65 717/169 |
| 2016/0013934 | A1* | 1/2016 | Smereka | H04L 9/32 713/171 |
| 2016/0364225 | A1* | 12/2016 | Moeller | G06F 16/24568 |
| 2018/0018164 | A1* | 1/2018 | Kurosawa | G06F 3/064 |
| 2018/0300472 | A1* | 10/2018 | Nakamura | G06F 21/45 |
| 2020/0057628 | A1* | 2/2020 | Sano | B60W 50/00 |

FOREIGN PATENT DOCUMENTS

| | | |
|---|---|---|
| JP | 5997740 B2 | 9/2016 |
| WO | WO-2016147766 A1 * | 9/2016 ........... B60R 16/023 |

OTHER PUBLICATIONS

Teraoka et al., "Incremental Update Method for Resource-Constrained In-vehicle ECUs", 2016, IEEE (Year: 2016).*
Cameron et al., "PARAMICS—Moving Vehicles on the Connection Machine", 1994, IEEE (Year: 1994).*
Sonnenberg, "Service and User Interface Transfer from Nomadic Devices to Car Infotainment Systems", Nov. 2010, ACM (Year: 2010).*

* cited by examiner

RELAY APPARATUS, TRANSFER METHOD, AND COMPUTER PROGRAM

TECHNICAL FIELD

The present invention relates to a relay apparatus, a transfer method, and a computer program.

This application claims priority on Japanese Patent Application No. 2017-078837 filed on Apr. 12, 2017, the entire contents of which are incorporated herein by reference.

BACKGROUND ART

In the automotive field in recent years, vehicles have become advanced in functionality, and a diverse range of devices are installed in vehicles. Accordingly, vehicles are equipped with large numbers of control devices, so-called ECUs (Electronic Control Units), for controlling these on-vehicle devices.

Each vehicle is equipped with various types of ECUs such as: traveling-type ECUs that control an engine, a brake, an EPS (Electric Power Steering), and the like in response to operations on an accelerator, a brake, and a handle; body-type ECUs that control ON/OFF of interior lights and headlights, sound of an alarm unit, and the like in response to switch operations performed by an occupant; and meter-type ECUs that control operations of meters arranged near the driver's seat.

Generally, each ECU consists of an arithmetic processing unit such as a microcomputer, and implements control of an on-vehicle device by reading out a control program stored in an ROM (Read Only Memory) and executing the read control program.

Control programs of ECUs may differ depending on the destinations, grades, and the like of vehicles. Therefore, old versions of control programs need to be overwritten with new versions thereof in response to upgrading of the control programs. In addition, data, such as map information and control parameters, necessary for execution of the control programs also need to be overwritten.

For example, Patent Literature 1 discloses a technology (online update function) of downloading an update program via a network, and performing update of a program.

CITATION LIST

Patent Literature

PATENT LITERATURE 1: Japanese Laid-Open Patent Publication No. 2015-37938.

SUMMARY OF INVENTION

A relay apparatus according to one embodiment is a relay apparatus configured to transfer an update program, which is downloaded from a server, for a control program of an on-vehicle control device to the on-vehicle control device. The relay apparatus includes: a calculation unit configured to calculate an index value indicating a proportion between a size of the control program and a size of the update program; and a transfer control unit configured to determine whether or not to permit the transfer, on the basis of the calculated index value.

A transfer method according to another embodiment is a method for transferring an update program, which is downloaded from a server, for a control program of an on-vehicle control device to the on-vehicle control device. The method includes: calculating an index value indicating a proportion between a size of the control program and a size of the update program; and determining whether or not to permit the transfer, on the basis of the index value.

A computer program according to still another embodiment is a computer program for causing a computer to function as a relay apparatus configured to transfer an update program, which is downloaded from a server, for a control program of an on-vehicle control device to the on-vehicle control device. The computer program causes the computer to function as: a calculation unit configured to calculate an index value indicating a proportion between a size of the control program and a size of the update program; and a transfer control unit configured to determine whether or not to permit the transfer, on the basis of the calculated index value.

DESCRIPTION OF EMBODIMENTS

Figure 1:
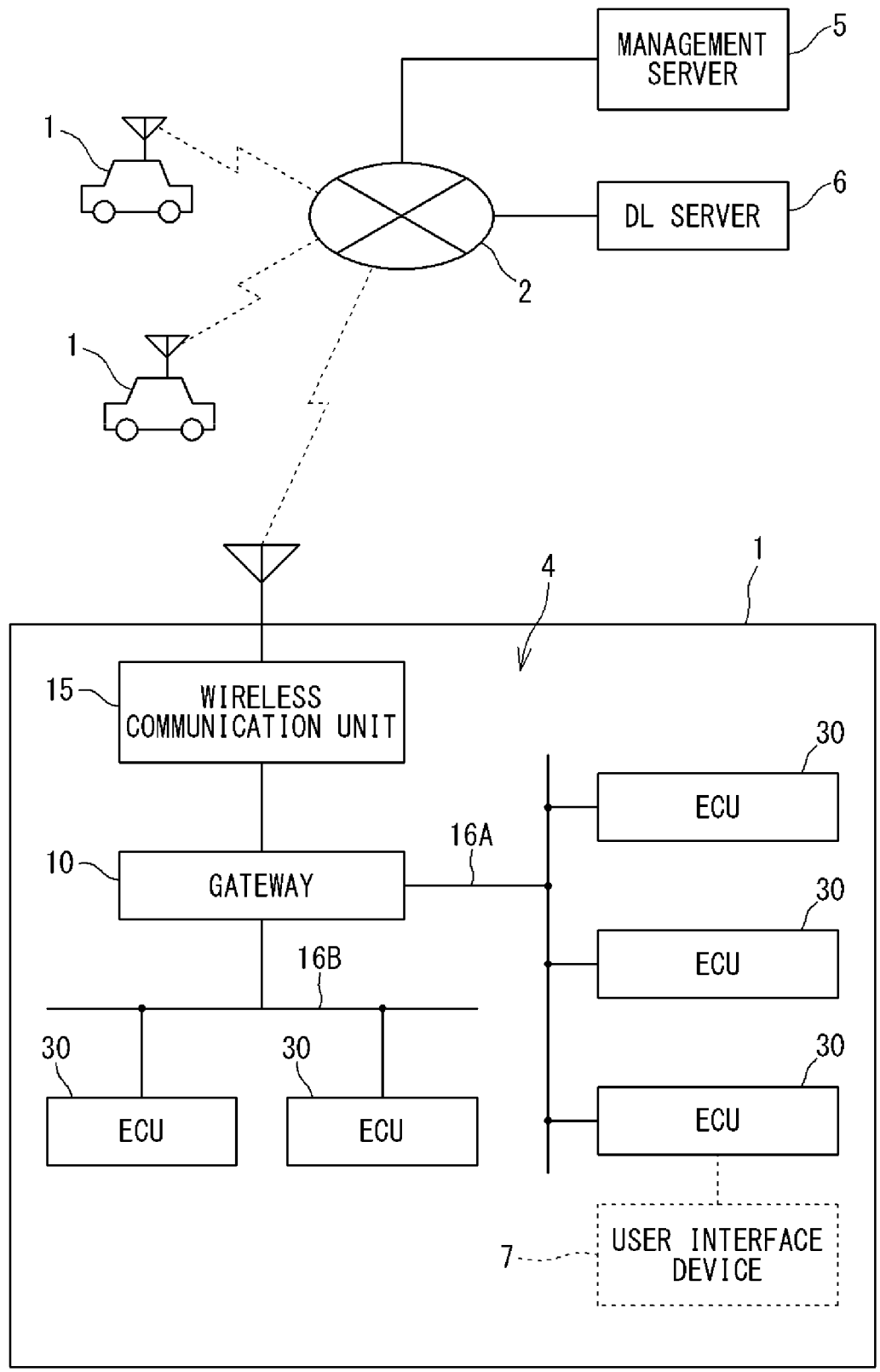
FIG. 1 is a diagram showing an overall configuration of a program updating system.

Problems to be Solved by the Present Disclosure

Executing online update as disclosed in Patent Literature 1 may cause loads on the device configuration related to the online update, such as an increase in communication load, and decrease in memory capacity due to update processing. Meanwhile, if such online update is completely refused, an update work by a dealer or the like is needed for each update, which deteriorates convenience of the user.

An object in one aspect of the present disclosure is to provide a relay apparatus, a transfer method, and a computer program which can achieve both improvement of user convenience and avoidance of loads on the device configuration related to online update when control data is updated.

Effect of the Present Disclosure

According to this disclosure, it is possible to achieve both improvement of user convenience and avoidance of loads on the device configuration related to online update.

Description of Embodiments

Embodiments of the present disclosure include at least the following.

(1) A relay apparatus included in the present embodiments is a relay apparatus configured to transfer an update program, which is downloaded from a server, for a control program of an on-vehicle control device to the on-vehicle control device. The relay apparatus includes: a calculation unit configured to calculate an index value indicating a proportion between a size of the control program and a size of the update program; and a transfer control unit configured to determine whether or not to permit the transfer, on the basis of the calculated index value.

There are cases where the device configurations related to online update, such as the available bandwidth of the in-vehicle communication line to which the on-vehicle control device is connected, and the size of the memory in the on-vehicle control device, is related to the size of the control program of the on-vehicle control device. In this case, determination as to whether or not to permit transfer of the update program to the on-vehicle control device is performed based on the index value indicating the proportion between the size of the control program and the size of the update program, whereby the transfer is executed according to the device configuration related to the online update. Therefore, by appropriately setting the proportion at which the transfer is permitted, it is possible to achieve both improvement of user convenience and avoidance of loads on the device configuration related to online update.

(2) Preferably, the index value is a value indicating a proportion of the size of the update program to the size of the control program. The transfer control unit starts the transfer when the index value is equal to or smaller than a threshold value, and does not start the transfer when the index value is greater than the threshold value.

By appropriately setting the threshold value, large-scale update is prevented from being executed through online update while the other update can be executed through online update. Thus, it is possible to achieve both improvement of user convenience and avoidance of loads on the device configuration related to online update.

(3) Preferably, the relay apparatus is connected to the on-vehicle control device via an in-vehicle communication line, and the transfer control unit changes the threshold value in accordance with an available bandwidth of the in-vehicle communication line.

Since the threshold value is changed according to the available bandwidth of the in-vehicle communication line connected to the on-vehicle control device, whether or not to permit the transfer is determined by use of the threshold value according to the in-vehicle communication line to be used for transfer. By setting the threshold value to an index value at which load on communication through the in-vehicle communication line is great, it is possible to refuse transfer of an update program having a large load on communication through the in-vehicle communication line. Thus, load on the in-vehicle communication line due to the transfer can be reduced.

(4) Preferably, the relay apparatus is connected to the on-vehicle control device via an in-vehicle communication line, and the transfer control unit changes the threshold value in accordance with operation states of one or a plurality of on-vehicle control devices connected to the in-vehicle communication line.

The bandwidth, of the in-vehicle communication line, available for transfer of the update program varies depending on the operation states of the one or the plurality of on-vehicle control devices connected to the in-vehicle communication line. Therefore, by changing, according to the operation states, the threshold value to an index value at which load on communication through the in-vehicle communication line is great, it is possible to refuse transfer of an update program that may cause a large load on communication through the in-vehicle communication line when update data is transferred. Thus, load on the in-vehicle communication line due to the transfer can be inhibited.

(5) Preferably, in a case where the index value is greater than the threshold value, the transfer control unit changes the threshold value according to the operation states, and again determines whether or not to permit the transfer, during a period in which the update data satisfies a predetermined condition for suspension.

There are cases where transfer of an update program, which was not permitted at a previous point in time, may be permitted if the threshold value changes and the operation states change thereafter. Thus, convenience of the user can be improved.

(6) Preferably, the operation states include a traveling speed of a vehicle on which the on-vehicle control device is mounted.

When the traveling speed of a vehicle is high, more information is exchanged on the in-vehicle network. Therefore, by using the threshold value according to the traveling speed of the vehicle, whether or not to permit the transfer can be determined with higher accuracy.

(7) Preferably, the relay apparatus is connected to a user interface device. In a case where the transfer control unit does not permit the transfer, the transfer control unit outputs a control signal that causes the user interface device to make a notification that the transfer is not permitted.

The user interface device is, for example, a display, a loudspeaker, or the like. The control signal outputted to the user interface device causes the user interface device to notify that the update program is not transferred to the on-vehicle control device, in other words, that online update is not executed. This notification allows the user to take a necessary countermeasure for update of the control program. Thus, convenience of the user can be improved.

(8) Preferably, the transfer control unit starts the download from the server when the transfer control unit permits the transfer.

The relay apparatus starts download of an update program from the server, and transfers the downloaded update program to the on-vehicle control device. Therefore, the downloaded update program need not be stored for a long period of time, thereby preventing the memory from being oppressed.

(9) A transfer method included in the embodiments of the present disclosure is a method for transferring an update program, which is downloaded from a server, for a control program of an on-vehicle control device to the on-vehicle control device, in the relay apparatus according to any one of the above (1) to (8).

This download method provides the same effects as those of the relay apparatuses according to the above (1) to (8).

(10) A computer program included in the embodiments of the present disclosure causes a computer to function as the relay apparatus according to any one of the above (1) to (8).

This computer program provides the same effects as those of the relay apparatuses according to the above (1) to (8).

Detailed Description of Embodiments

Hereinafter, preferred embodiments will be described with reference to the drawings. In the following description, the same reference numerals refer to the same components and constituent elements. The names and functions thereof are also the same. Therefore, repeated description thereof is not necessary.

First Embodiment

Overall Configuration of System

FIG. 1 is a diagram showing an overall configuration of a program updating system according to an embodiment.

As shown in FIG. 1, the program updating system of this embodiment includes vehicles 1, a management server 5, and a DL (download) server 6 which are communicable with each other via a wide-area communication network 2.

The management server 5 manages update information of each vehicle 1. The DL server 6 stores therein update programs. The management server 5 and a DL server 6 are operated by, for example, the automobile manufacturer of the vehicles 1, and are communicable with large numbers of vehicles 1 owned by users registered as members in advance.

Each vehicle 1 is provided with: an in-vehicle network (communication network) 4 including a plurality of ECUs 30 and a gateway 10 which are connected via in-vehicle communication lines 16; a wireless communication unit 15; and various on-vehicle devices (not shown) controlled by the respective ECUs 30. The on-vehicle devices include a user interface device 7 such as a display or a loudspeaker.

The in-vehicle network 4 has a plurality of in-vehicle communication lines 16A and 16B, and includes a plurality of communication groups, each consisting of a plurality of ECUs 30, which are bus-connected to the respective in-vehicle communication lines 16A and 16B. The gateway 10 relays communication between the communication groups. Therefore, the in-vehicle communication lines 16A and 16B are connected to the gateway 10. The in-vehicle communication lines 16A and 16B are also collectively referred to as in-vehicle communication lines 16.

The wireless communication unit 15 is communicably connected to the wide-area communication network 2 such as a mobile phone network, and is connected to the gateway 10 via an in-vehicle communication line. The wireless communication unit 15 receives information from external devices such as the management server 5 and the DL server 6 via the wide-area communication network 2, and the gateway 10 transmits the information to the ECUs 30 via the in-vehicle communication line 16.

The gateway 10 transmits information obtained from the ECUs 30 to the wireless communication unit 15, and the wireless communication unit 15 transmits the information to the external devices such as the management server 5.

The ECUs 30 exchange information via the in-vehicle communication line 16.

As for the wireless communication unit 15 installed in the vehicle 1, devices such as a mobile phone, a smart phone, a tablet-type terminal, and a notebook PC (Personal Computer) possessed by the user are conceivable in addition to an on-vehicle exclusive communication terminal.

FIG. 1 shows an exemplary case where the gateway 10 communicates with the external devices via the wireless communication unit 15. However, if the gateway 10 has a wireless communication function, the gateway 10 itself may wirelessly communicate with the external devices such as the management server 5.

In the program updating system shown in FIG. 1, the management server 5 and the DL server 6 are configured as separated servers. However, these servers 5 and 6 may be configured as a single server unit. Each of the management server 5 and the DL server 6 may be composed of a plurality of devices.

Internal Configuration of Gateway

Figure 2:
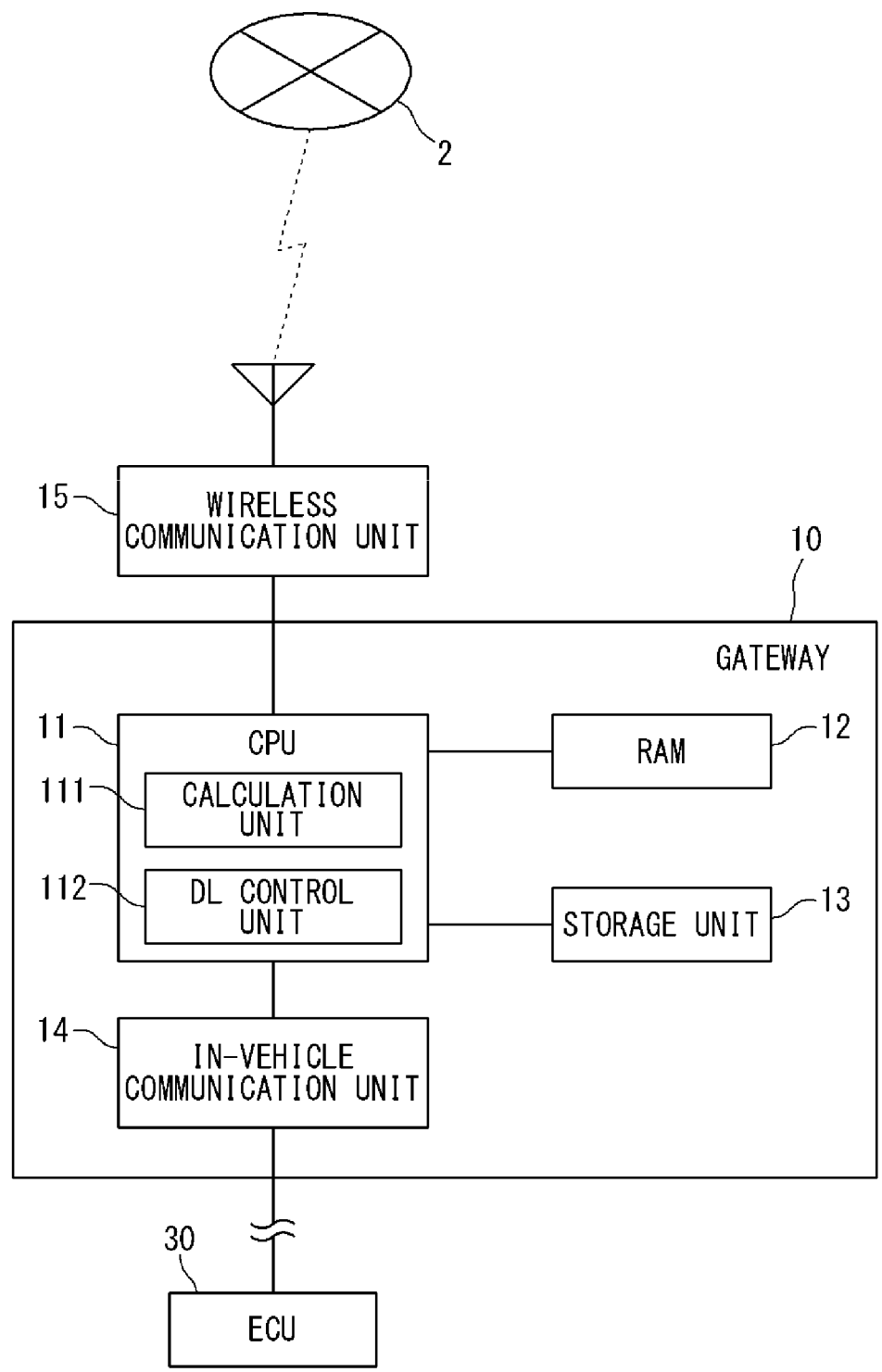
FIG. 2 is a block diagram showing an internal configuration of a gateway.

FIG. 2 is a block diagram showing the internal configuration of the gateway 10.

As shown in FIG. 2, the gateway 10 includes a CPU 11, an RAM (Random Access Memory) 12, a storage unit 13, an in-vehicle communication unit 14, and the like. Although the gateway 10 is connected to the wireless communication unit 15 via the in-vehicle communication line, the gateway 10 and the wireless communication unit 15 may be integrated with each other as a single device.

The CPU 11 causes the gateway 10 to function as a relay apparatus for relaying various kinds of information, by reading out one or a plurality of programs stored in the storage unit 13 to the RAM 12 and executing the read programs.

The CPU 11 can execute a plurality of programs in parallel by switching between the programs in a time sharing manner, for example. The CPU 11 may be a CPU representing a plurality of CPU groups. In this case, a function to be implemented by the CPU 11 is a function to be implemented by the plurality of CPU groups in cooperation with each other. The RAM 12 consists of a memory element such as an SRAM (Static RAM) or a DRAM (Dynamic RAM), and temporarily stores therein programs to be executed by the CPU 11, data required in executing the programs, and the like.

A computer program implemented by the CPU 11 can be transferred in a state of being recorded in a well-known recording medium such as a CD-ROM or a DVD-ROM, or may be transferred by data transmission from a computer device such as a server computer.

In this aspect, the same applies to a computer program executed by a CPU 31 of the ECU 30 (refer to FIG. 3) described later, and a computer program executed by a CPU 51 of the management server 5 (refer to FIG. 4) described later.

In the following description, transfer (transmission) of data from a host device to a client device is also referred to as "download".

The storage unit 13 consists of a nonvolatile memory element, such as a flash memory or an EEPROM, and the like. The storage unit 13 stores therein programs to be executed by the CPU 11, data required for execution of the programs, and the like, and also stores therein update programs, to be downloaded, for the respective ECUs 30 received from the DL server 6, and the like.

The plurality of ECUs 30 are connected to the in-vehicle communication unit 14 via the in-vehicle communication lines 16 arranged in the vehicle 1. The in-vehicle communication unit 14 communicates with the ECUs 30 according to the standard of CAN (Controller Area Network), for example. The communication standard adoptable by the in-vehicle communication unit 14 is not limited to CAN. Other standards such as CANFD (CAN with Flexible Data Rate), LIN (Local Interconnect Network), Ethernet (registered trademark), or MOST (Media Oriented Systems Transport: MOST is registered trademark) may be adopted. The plurality of in-vehicle communication lines 16A and 16B may include communication lines based on different communication standards.

The in-vehicle communication unit 14 transmits information provided from the CPU 11 to target ECUs 30, and provides information received from the ECUs 30 to the CPU 11. The in-vehicle communication unit 14 may communicate with the ECUs 30 according to other communication standards that are used for the in-vehicle network 4, apart from the above communication standards.

The wireless communication unit 15 includes a wireless communication apparatus including an antenna and a communication circuit that executes transmission/reception of radio signals from the antenna. The wireless communication unit 15 is able to communicate with the external devices when being connected to the wide-area communication network 2 such as a mobile phone network.

The wireless communication unit 15 transmits information provided from the CPU 11 to the external devices such as the management server 5 via the wide-area communication network 2 formed by a base station (not shown), and provides information received from the external devices to the CPU 11.

Instead of the wireless communication unit 15 shown in FIG. 2, a wired communication unit that functions as a relay apparatus inside the vehicle 1 may be adopted. This wired communication unit has a connector to which a communication cable conforming to a standard such as USB (Universal Serial Bus) or RS232C is connected, and performs wired communication with another communication device connected thereto via the communication cable.

If the other communication device and the external device such as the management server 5 can wirelessly communicate with each other via the wide-area communication network 2, the external device and the gateway 10 become communicable with each other through a communication path consisting of, in this order, the external device, the other communication device, the wired communication unit, and the gateway 10.

Internal Configuration of ECU

Figure 3:
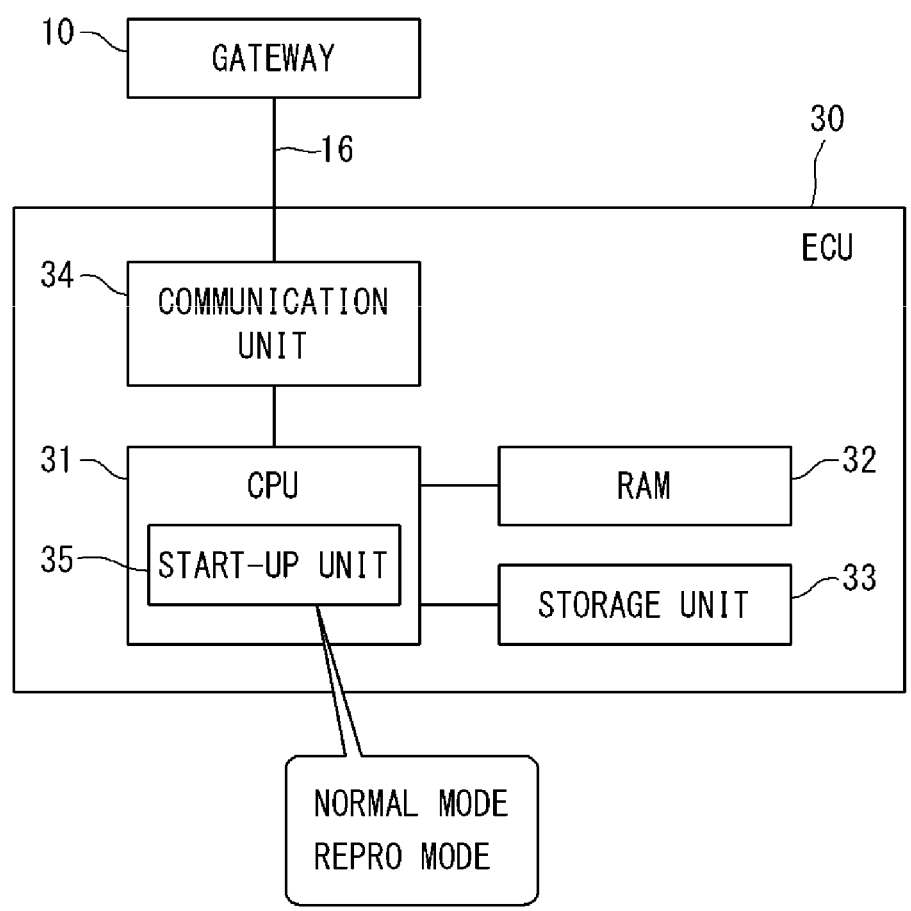
FIG. 3 is a block diagram showing an internal configuration of an ECU.

FIG. 3 is a block diagram showing the internal configuration of an ECU 30.

As shown in FIG. 3, the ECU 30 includes a CPU 31, an RAM 32, a storage unit 33, a communication unit 34, and the like. The ECU 30 is an on-vehicle control device that separately controls a target device installed in the vehicle 1. Examples of the types of ECUs 30 include a power supply control ECU, an engine control ECU, a steering control ECU, and a door lock control ECU.

The CPU 31 controls the operation of a target device under the charge of the CPU 31, by reading out one or a plurality of programs previously stored in the storage unit 33 to the RAM 32 and executing the read program. The CPU 31 may also be a CPU representing a plurality of CPU groups, and a control to be performed by the CPU 31 may be performed by the plurality of CPU groups in cooperation with each other.

The RAM 32 consists of a memory element such as an SRAM or a DRAM, and temporarily stores therein programs to be executed by the CPU 31, data required in executing the programs, and the like.

The storage unit 33 consists of, for example, a nonvolatile memory element such as a flash memory or an EEPROM, or a magnetic storage device such as a hard disk.

The storage unit 33 stores therein programs to be read and executed by the CPU 31. Examples of information stored in the storage unit 33 include: a computer program that causes the CPU 31 to execute information processing for controlling target equipment that is an in-vehicle control target; and a control program that is data to be used in executing the program, such as parameters and map information.

The gateway 10 is connected to the communication unit 34 via the in-vehicle communication line 16 arranged in the vehicle 1.

The communication unit 34 communicates with the gateway 10 according to a standard such as CAN, Ethernet, or MOST, for example.

The communication unit 34 transmits information provided from the CPU 31 to the gateway 10, and provides information received from the gateway 10 to the CPU 31. The communication unit 34 may communicate with the gateway 10 according to other communication standards that are used for the on-vehicle network, apart from the above communication standards.

The CPU 31 of the ECU 30 includes a start-up unit 35 that switches the mode of control performed by the CPU 31 between a "normal mode" and a "reprogramming mode" (hereinafter also referred to as "repro mode").

The normal mode is a control mode in which the CPU 31 of the ECU 30 executes original control for the target device (e.g., engine control for a fuel engine or door lock control for a door lock motor).

The reprogramming mode is a control mode in which the CPU 31 updates the control program used for controlling the target device.

That is, the reprogramming mode is a control mode in which the CPU 31 performs erasing/overwriting of data of the control program from/on an ROM area in the storage unit 33. The CPU 31, only in this control mode, can update the control program stored in the ROM area in the storage unit 33 to the new version.

In the repro mode, when the CPU 31 writes the new version of the control program into the storage unit 33, the start-up unit 35 temporarily restarts (resets) the ECU 30, and executes a verifying process on a storage area where the new version of the control program has been written.

After completion of the verifying process, the start-up unit 35 operates the CPU 31 with the updated control program.

A process of downloading an update program to an ECU 30 from the DL server 6 via the gateway 10 and updating the control program by using the update program, is also referred to as online update.

Internal Structure of Management Server

Figure 4:
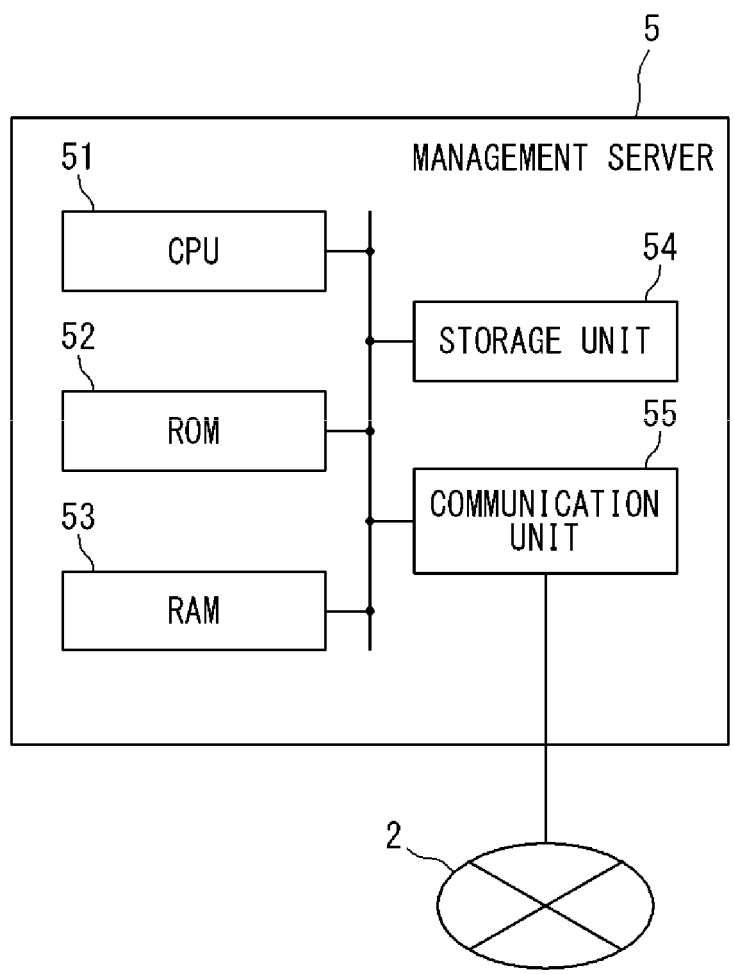
FIG. 4 is a block diagram showing an internal configuration of a management server.

FIG. 4 is a block diagram showing the internal structure of the management server 5.

As shown in FIG. 4, the management server 5 includes a CPU 51, an ROM 52, an RAM 53, a storage unit 54, a communication unit 55, and the like.

By reading out one or a plurality of programs previously stored in the ROM 52 to the RAM 53 and executing the read program, the CPU 51 controls the operation of each hardware component, and causes the management server 5 to function as an external device that is communicable with the gateway 10. The CPU 51 may also be a CPU representing a plurality of CPU groups, and a function to be implemented by the CPU 51 may be a function to be implemented by the plurality of CPU groups in cooperation with each other.

The RAM 53 consists of a memory element such as an SRAM or a DRAM, and temporarily stores therein programs to be executed by the CPU 51, data required in executing the programs, and the like.

The storage unit 54 consists of, for example, a nonvolatile memory element such as a flash memory or an EEPROM, or a magnetic storage device such as a hard disk.

The communication unit 55 consists of a communication device that executes a communication process according to a predetermined communication standard. The communication unit 55 executes the communication process while being connected to the wide-area communication network 2 such as a mobile phone network. The communication unit 55 transmits information provided from the CPU 51 to external devices via the wide-area communication network 2, and provides information received via the wide-area communication network 2 to the CPU 51.

Control Program Updating Sequence

Figure 5:
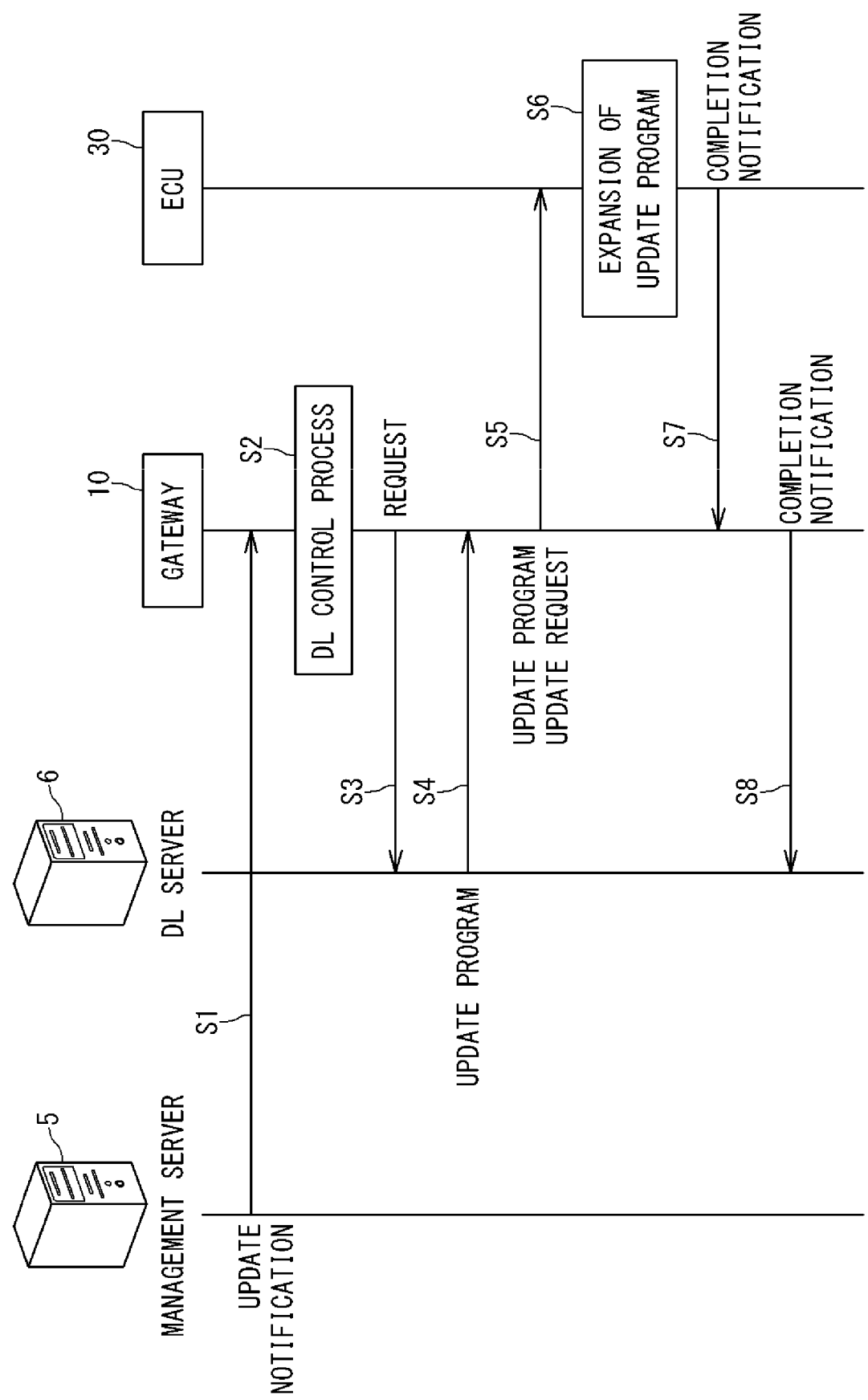
FIG. 5 is a sequence diagram showing an example of flow of online updating of a control program, which is executed in the program updating system.

FIG. 5 is a sequence diagram showing an example of a flow of update of a control program, which is executed in the program updating system of the present embodiment. One or a plurality of update programs are stored in the DL server 6, and for example, the management server 5 determines a timing to update a control program of an ECU of the vehicle 1. The timing of update may be set by, for example, the automobile manufacturer of the vehicle 1.

A control program is not limited to the program itself, and includes data such as parameters and map information to be used in executing the program. The term "control program" represents both the program and the data. Likewise, an update program includes not only a program for updating a program but also data for updating data used for executing the program.

When a time to update the control program has arrived, the management server 5 notifies the gateway 10 of the corresponding vehicle 1 of the update (step S1). In step S1, information for update, such as a destination URL of the update program and the size of the update program, is transmitted together with a download request from the management server 5 to the gateway 10.

Upon receiving the notification of update from the management server 5, the gateway 10 executes a download control process (step S2). The download control process includes a process of determining whether or not to permit transfer the update program to the ECU 30, and executing the transfer based on the determination result. This process will be described later in detail.

When transfer of the update program to the ECU 30 is permitted through the download control process in step S2, the gateway 10 relays the update program downloaded from the DL server 6 to the ECU 30. That is, based on the information for update, the gateway 10 requests the DL server 6 to download the update program (step S3), and the update program is downloaded from the DL server 6 to the gateway 10.

Upon receiving the download request from the gateway 10, the DL server 6 transfers (relays), to the gateway 10, the update program to be downloaded, and requests update of the control program (step S4).

The gateway 10 downloads the update program, and then transfers the update program to the ECU 30 and requests update of the control program (step S5). The gateway 10 may transfer the update program upon receiving permission of update from the user.

The ECU 30, which has received the update program, expands the update program in response to the request from the gateway 10, and updates the control program (step S6). When the update is completed, the target ECU 30 notifies the gateway 10 of completion of the update (step S7). Upon receiving this notification, the gateway 10 notifies the DL server 6 of the completion of the update (step S8).

Functional Configuration of Gateway

With reference to FIG. 2, the CPU 11 of the gateway 10 includes a calculation unit 111 and a download (DL) control 112 as functions for executing the download control process. These functions are implemented by the CPU 11 when the CPU 11 reads out one or a plurality of programs stored in the storage unit 13 and executes the read program. However, at least a part of the functions may be implemented by hardware such as an electronic circuit.

The function of the CPU 11 represented as the calculation unit 111 (hereinafter, this function is referred to as "calculation unit 111") calculates an index value regarding an index that indicates a proportion between a size X of a control program to be updated and a size $\Delta X$ of an update program. The calculated index value is used for determining whether or not to permit transfer of the update program to the target ECU 30. The index value is $\Delta X/X$, for example. The index value may be $X/\Delta X$ or $X-\Delta X$.

The calculation unit 111 may store the size X in advance, or may acquire the size X from the target ECU 30. The calculation unit 111 reads the size $\Delta X$ from the information for update supplied from the management server 5.

The function of the CPU 11 represented by the DL control unit 112 (hereinafter, this function is referred to as "DL control unit 112") determines whether or not to permit transfer of the update program to the ECU 30, on the basis of the index value. When the determination result is positive, that is, when the transfer is permitted, download from the DL server 6 is started. When the determination result is negative, that is, when the transfer is not permitted, download is not performed.

The DL control unit 112 stores, in advance, a threshold value Th of the index value $\Delta X/X$ at which the transfer is permitted. The DL control unit 112 determines whether or not to permit the transfer, on the basis of the result of comparison between the index value $\Delta X/X$ and the threshold value Th. That is, when the index value $\Delta X/X$ is equal to or smaller than the threshold value Th, the DL control unit 112 determines to transfer the update program to the ECU 30, that is, determines to start download from the DL server 6. When the index value $\Delta X/X$ is greater than the threshold value Th, the DL control unit 112 determines not to transfer the update program to the ECU 30, that is, determines not to execute download.

The index value $\Delta X/X$ being greater than the threshold value Th means that the proportion of data to be updated is great with respect to the control program, which means that the scale of the update is large. The index value $\Delta X/X$ being equal to or smaller than the threshold value Th means that the proportion of data to be updated is small with respect to the control program, which means that the scale of the update is small.

Download Control Process

Figure 6:
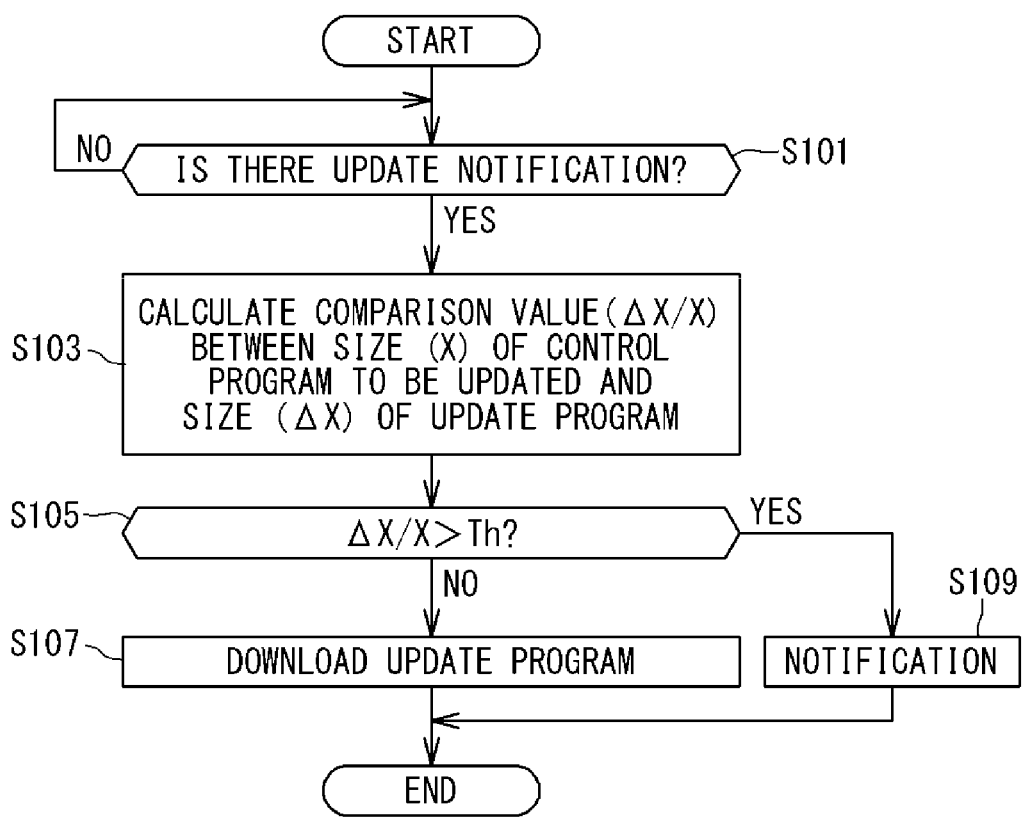
FIG. 6 is a flowchart showing a specific content of a download control process in the program updating system according to a first embodiment.

FIG. 6 is a flowchart showing the specific content of the download control process in the program updating system according to the first embodiment. The process shown in the flowchart of FIG. 6 is executed when the CPU 11 of the gateway 10 implements the functions of the calculation unit 111 and the DL control unit 112 by reading out one or a plurality of programs stored in the storage unit 13 onto the RAM 12 and executing the read program. The process shown in FIG. 6 is repeatedly executed at a pre-defined timing such as a predetermined time interval when the CPU 11 has been activated.

With reference to FIG. 6, the CPU 11 determines whether or not update of a control program has been notified from the management server 5, that is, whether or not there is an update program to be downloaded (step S101). When there is no update program to be downloaded (NO in step S101), the CPU 11 does not perform the subsequent operation, and stands by until a next pre-defined timing comes.

When there is an update program to be downloaded (YES in step S101), the CPU 11 acquires the size ΔX from the notification of update received from the management server 5. In addition, the CPU 11 acquires the size X from the target ECU 30. Then, the CPU 11 calculates the index value ΔX/X (step S103).

The CPU 11 compares the index value ΔX/X with the threshold value Th that is stored in advance (step S105). When the index value ΔX/X is equal to or smaller than the threshold value Th (NO in step S105), the CPU 11 permits transfer of the update program to the ECU 30 (step S107). In this case, the CPU 11 executes the operation from step S3 in FIG. 5.

When the index value ΔX/X is greater than the threshold value Th (YES in step S105), the CPU 11 does not permit transfer of the update program to the ECU 30. In this case, the CPU 11 outputs a control signal that causes the user interface device 7 to make notification, to an ECU 30 that controls the user interface device 7. Thus, notification is performed by the user interface device (step S109). In this case, the operation from step S3 in FIG. 5 is not performed.

Examples of the notification in step S109 include: notification indicating that the update program is not transferred to the ECU 30; notification that urges the user to stop the vehicle 1 and set the vehicle 1 in the repro mode; and notification that urges update of the control program by a dealer. This notification allows the user to know that the update program is not transferred to the ECU 30, in other words, that online update is not executed. Therefore, the user can take a countermeasure for update of the control program, such as causing the vehicle 1 to stop and enter the repro mode, or garaging the vehicle 1 and asking the dealer for update of the control program.

Through the aforementioned operation, the CPU 11 ends, for one update program, determination whether or not to permit transfer of this update program to an ECU 30. The CPU 11 repeats the above operation. Therefore, the CPU 11 determines whether or not to permit transfer of a next update program to an ECU 30. That is, when transfer of a certain update program to an ECU 30 is not permitted, whether or not to permit transfer of a next update program is determined. When the determination result is positive, download of this update program from the DL server 6 as well as transfer thereof to the ECU 30 are started. Thus, a plurality of update programs can be efficiently transferred to the corresponding ECUs 30, thereby efficiently performing update of the corresponding control programs.

Effect of First Embodiment

In the program updating system according to the first embodiment, when the size ΔX of an update program is smaller than the size X of a control program to be updated, in other words, when the scale of update is smaller than a predetermined scale, the update program is transferred to the corresponding ECU 30, and the control program is updated. When the update is large, the update program is not transferred to the ECU 30, and therefore, online update is not executed.

There are cases where the device configurations related to online update, such as an available bandwidth (communication rate) of an in-vehicle communication line 16 to which a target ECU 30 is connected, and the storage capacity of the storage unit 33 in the ECU 30, are related to the size of the control program of the ECU 30. That is, when the size of the control program is large, the available bandwidth of the in-vehicle communication line 16 or the memory capacity of the ECU 30 may also be large in accordance with the size. In this case, if large-scale update is executed through online update, this update may cause an increase in communication load on the in-vehicle communication line 16, or oppression of the memory in the ECU 30. On the other hand, if a uniform maximum size is set for update programs to be permitted for transfer, there may be cases where, depending on the in-vehicle communication line 16, the communication load is not increased due to transfer of the update program because the available bandwidth of the in-vehicle communication line 16 is large, and where, depending on the ECU 30, the update process does not greatly oppress the memory because the memory capacity is large. In these cases, if it is determined not to execute online update, convenience of the user is deteriorated.

Meanwhile, since the program updating system according to the first embodiment determines whether or not to permit transfer of an update program on the basis of the proportion between the size X and the size ΔX, the load on the device configuration related to the online update is reflected in the determination whether or not to permit the transfer. Therefore, in the program updating system according to the first embodiment, it is possible to update a control program while achieving both improvement of user convenience and avoidance of loads on the device configuration related to the online update.

Modification

The aforementioned threshold value Th may be varied according to the available bandwidths of the in-vehicle communication lines 16 which are used for transfer of update programs and to which the ECUs 30 are connected. In other words, the plurality of in-vehicle communication lines 16A and 16B may include in-vehicle communication lines 16 having different available bandwidths. As for the available bandwidth of each in-vehicle communication line 16, restriction on communication capacity (residual capacity) in communication with the gateway 10 may be considered.

In this case, the DL control unit 112 stores threshold values Th corresponding to the available bandwidths of the in-vehicle communication lines 16 in advance. The DL control unit 112 determines whether or not to permit transfer of an update program by using a threshold value Th corresponding to an in-vehicle communication line 16 to which an ECU 30 as a destination of the update program is connected.

As described above, whether or not to permit transfer of an update program is determined by using a threshold value Th according to an in-vehicle communication line 16 to be used for transfer of the update program. Thus, whether or not to perform the transfer can be determined in accordance with the available bandwidth of the in-vehicle communication line 16 to be used for the transfer. By setting the threshold value Th to an index value at which load on communication through the in-vehicle communication line 16 is great, transfer of an update program having a large load on communication through the in-vehicle communication line 16 is not permitted. Thus, load on the in-vehicle communication line 16 due to transfer of the update program can be reduced.

Second Embodiment

In the program updating system according to the first embodiment, the gateway 10 stores the threshold values Th in advance. However, the bandwidth of an in-vehicle communication line 16 available for transfer of an update program varies depending on the operation states of one or a plurality of ECUs 30 that are connected to the in-vehicle communication line 16 to which an ECU 30, as a destination to which the update program is transferred, is connected. Examples of the operation states include: the traveling speed of the vehicle 1; the types and the number of operating ECUs 30; the operation levels of the one or the plurality of ECUs 30; and a combination thereof.

For example, when the traveling speed of the vehicle 1 is high, more information is exchanged on an in-vehicle communication line 16, and therefore, the bandwidth of the in-vehicle communication line 16 available for transfer of an update program is narrowed. Further, when the traveling speed of the vehicle 1 is high, the maximum occupancy permitted for the in-vehicle communication line 16 may be set to be low, and therefore, the bandwidth of the in-vehicle communication line 16 available for transfer of the update program is narrowed.

Further, the larger the number of operating ECUs 30 among the plurality of ECUs 30, the more information is exchanged among the ECUs 30, and therefore, the bandwidth of the in-vehicle communication line 16 available for transfer of the update program is narrowed. In addition, the operating ECUs 30 may have different communication traffics on the in-vehicle communication line 16. When ECUs 30 having great communication traffics are operating, more information is exchanged on the in-vehicle communication line 16, and therefore, the bandwidth of the in-vehicle communication line 16 available for transfer of the update program is narrowed.

For example, when one ECU 30 or a plurality of ECUs 30 in cooperation contributes/contribute to a driving support function, the communication traffic in the in-vehicle communication line 16 may be varied depending on the support level of the driving support function. At a support level that causes the communication traffic to be high, more information is exchanged on the in-vehicle communication line 16, and therefore, the bandwidth of the in-vehicle communication line 16 available for transfer of the update program is narrowed.

Therefore, in the program updating system according to the second embodiment, the threshold value Th is changed (determined) according to the operation states of one or a plurality of ECUs 30 that are connected to the in-vehicle communication line 16 together with the ECU 30 as a transfer destination. The ECU 30 as the transfer destination may be included in the one or the plurality of ECUs 30.

The DL control unit 112 of the gateway 10 according to the second embodiment determines whether or not to permit transfer of an update program on the basis of: a proportion between the size X of a control program and the size $\Delta X$ of the update program; and the operation states of one or a plurality of ECUs 30 that are connected to an in-vehicle communication line 16 together with an ECU 30 as a transfer destination. For the purpose of determining whether or not to permit the transfer in consideration of the operation states, the DL control unit 112 according to the second embodiment changes the threshold value Th on the basis of the operation states.

The operation states change in a fluid manner. Thus, even when the index value $\Delta X/X$ of the update program is equal to or greater than the threshold value Th, if the update program satisfies a predetermined condition for suspension, the DL control unit 112 according to the second embodiment suspends determination not to transfer the update program to the ECU 30. Examples of the condition for suspension include: the current time being within a predetermined period from when the update program has been determined to be downloadable; the number of times of determination whether or not to transfer the update program being within a predetermined number of times; another update program to be downloaded being present in the DL server 6; and a combination thereof.

As one example, the DL control unit 112 stores a correspondence relation between the operation states and the threshold values Th in advance. The DL control unit 112 reads a threshold value Th corresponding to an operation state from the correspondence relation. As another example, the DL control unit 112 may store, in advance, a calculation formula for a threshold value Th with an index representing an operation state as a parameter. In this case, the DL control unit 112 calculates the threshold value Th by substituting an index value of the index representing the operation state into the calculation formula. For example, the index representing the operation state is the traveling speed of the vehicle 1, and the speed is substituted as the index value into the calculation formula.

If transfer of an update program is not permitted, download of this update program from the DL server 6 is not started at the time of the determination, and the update program is held in the DL server 6 as an update program to be downloaded. In this case, the DL control unit 112 again determines whether or not to permit transfer of this update program, within the period in which the condition for suspension is satisfied.

As the operation state changes, the threshold value Th also changes. Therefore, even when transfer of an update program has not been permitted, the transfer may be permitted at some later point in time if the threshold value Th is changed. In this case, download from the DL server 6 will be started at the later point in time.

Transfer Control Process

Figure 7:
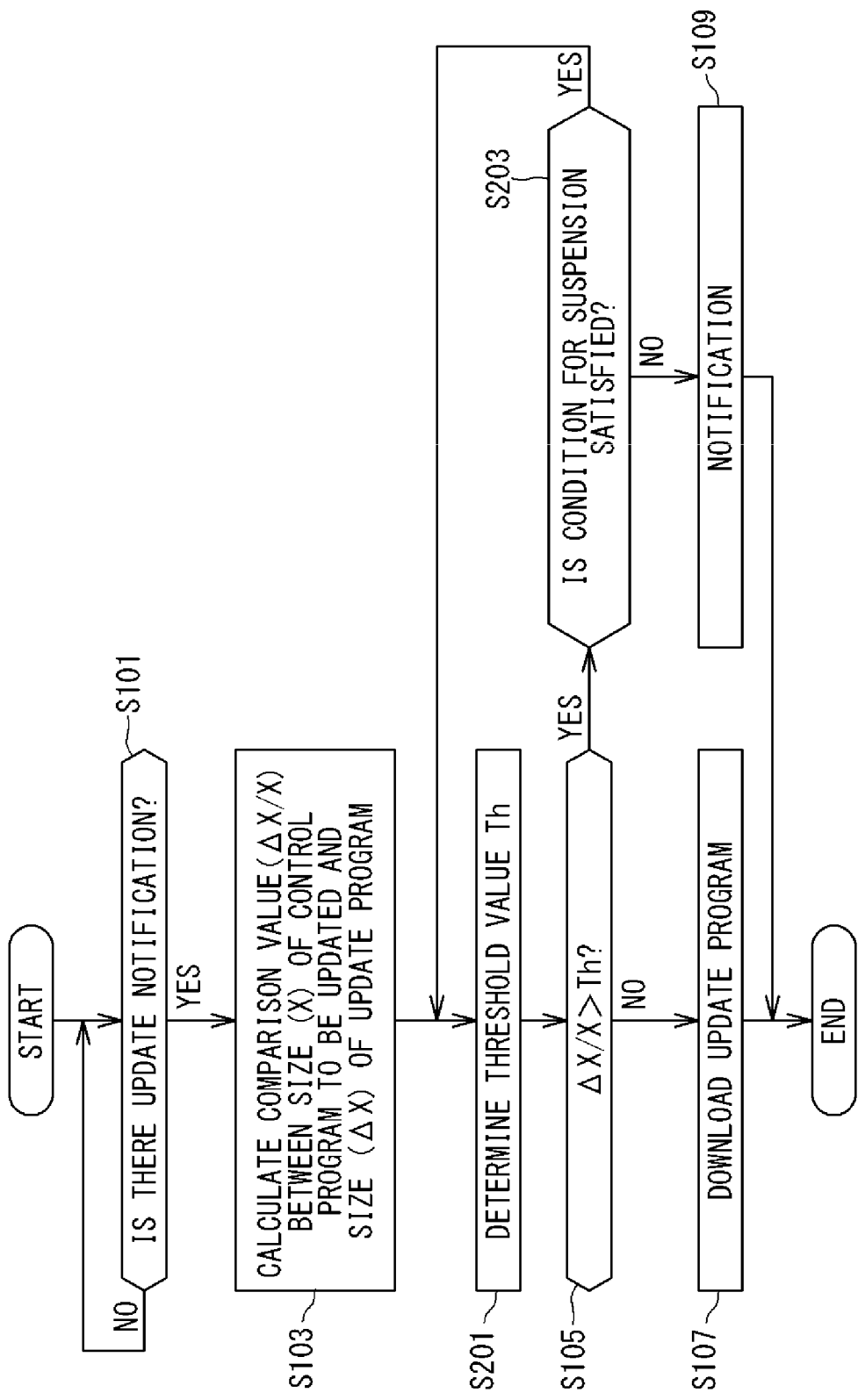
FIG. 7 is a flowchart showing a specific content of a download control process in the program updating system according to a second embodiment.

FIG. 7 is a flowchart showing the specific content of the download control process in the program updating system according to the second embodiment. The process shown in the flowchart of FIG. 7 is also executed when the CPU 11 of the gateway 10 implements the functions of the calculation unit 111 and the DL control unit 112 by reading out one or a plurality of programs stored in the storage unit 13 onto the RAM 12 and executing the read program. In the flowchart of FIG. 7, operations assigned with the same step numbers as those in the flowchart of FIG. 6 are the same in contents as the operations shown in the flowchart of FIG. 6. Hereinafter, different points from the flowchart of FIG. 6 will be described.

With reference to FIG. 7, when determining whether or not to permit transfer of an update program, the CPU 11 determines a threshold value Th on the basis of the operation state at that time (step S201). Then, the CPU 11 compares the determined threshold value Th with an index value ΔX/X (step S105).

When the index value ΔX/X is greater than the threshold value Th (YES in step S105), the CPU 11 further determines whether or not the update program satisfies a predetermined condition for suspension (step S203). When the update program satisfies the condition for suspension (YES in step S203), the CPU 11 suspends determination not to transfer the update program. In this case, the update program is not downloaded from the DL server 6 at that time, but is held in the DL server 6. Then, after a predetermined period has passed, the CPU 11 resumes the operation from step S201.

Effect of Second Embodiment

In the program updating system according to the second embodiment, even when transfer of an update program was not permitted at the time of previous determination, whether or not to permit the transfer is again determined within a period in which the update program satisfies a predetermined condition for suspension. In this program updating system, the threshold value Th is changed according to changes in the operation states, which occur within the period in which the condition for suspension is satisfied, of one or a plurality of ECUs 30 that are connected to an in-vehicle communication line 16 together with an ECU 30 as a transfer destination. As a result, when the index value ΔX/X becomes equal to or smaller than the threshold value Th, transfer of this update program is permitted at the time of subsequent determination. In this case, download from the DL server 6 is executed at the time of subsequent determination. Therefore, convenience of the user can be improved, and update of a control program can be performed while avoiding loads on the device configuration related to online update, such as an increase in communication load and oppression of a memory.

Modifications

In the program updating systems according to the first and second embodiments, transfer of an update program to an ECU 30 is performed subsequently to the download of this update program from the DL server 6 to the gateway 10. Therefore, download from the DL server 6 is started when the transfer is permitted, whereas download from the DL server 6 is not executed when the transfer is not permitted. In other words, in the program updating systems according to the first and second embodiments, determination whether or not to permit transfer of an update program is also determination whether or not to permit download from the DL server 6, and therefore, start of the transfer corresponds to start of the download. Therefore, the gateway 10 executes the DL control process (step S2) before download of the update program from the DL server 6 to the ECU 30, that is, before step S3 (FIG. 5). Thus, the update program is prevented from being held in the storage unit 13 of the gateway 10 for a long period of time, and oppressing the memory.

In the program updating system according to a modification, transfer of the update program to the ECU 30 is executed at a timing independent of download of the update program from the DL server 6 to the gateway 10. That is, the gateway 10 downloads the update program from the DL server 6 and stores the update program in the storage unit 13, and determines whether or not to permit transfer of the stored update program to the ECU 30. In other words, in the program updating system according to the modification, the DL control process is executed between step S3 and step S4.

In this case, the DL control unit 112 executes download of the update program from the DL server 6 to the gateway 10 at a predetermined timing such as a timing when the management server 5 requests the download. Then, the DL control unit 112 determines whether or not to permit transfer of the stored update program to the ECU 30, and starts the transfer in accordance with the result of the determination.

In the program updating system according to the modification, download and transfer can be performed at the respective optimum timings, whereby online update can be efficiently performed. In particular, in the program updating system according to the second embodiment, even when transfer of an update program is not permitted, whether or not to permit the transfer is again determined within a period in which the update program satisfies the condition for suspension. In this case, according to the modification, the gateway 10 does not discard the update program for which transfer has not been permitted, but holds the update program in the storage unit 13. Thus, when the update program is transferred to the ECU 30 in accordance with the result of the determination performed again, the update program can be transferred to the ECU 30 without the trouble of downloading the update program again from the DL server 6. Therefore, the entirety of the transfer of the update program from the DL server 6 to the ECU 30 can be advanced, and unnecessary communication can be inhibited.

The disclosed feature is implemented by one or more modules. For example, the feature can be implemented by: hardware modules such as circuit elements, etc.; software modules defining processes that realize the feature; or a combination of the hardware modules and the software modules.

The disclosed feature may be provided as a program, which is a combination of one or more software modules, for causing a computer to execute the aforementioned operation. Such a program may be recorded in a computer-readable recording medium, such as a flexible disc, a CD-ROM (Compact Disk-Read Only Memory), an ROM, an RAM, a memory card adjunct to the computer, and provided as a program product. Alternatively, the program may be provided by being recorded in a recording medium such as a hard disk incorporated in the computer. The program may also be provided by being downloaded through a network.

The program according to the present disclosure may call up necessary modules in a predetermined array at a predetermined timing from among program modules provided as a portion of an operating system (OS) of a computer, and may cause processing to be executed. In this case, the modules are not included in the program itself, and the processing is executed in cooperation with the OS. The program according to the present disclosure also includes such a program including no modules.

The program according to the present disclosure may be provided by being incorporated in a portion of another program. In this case as well, modules included in the other program are not included in the program itself, and processing is executed in cooperation with the other program. The program according to the present disclosure also includes such a program incorporated in another program. A program product to be provided is installed in a program storage unit such as a hard disk, and then executed. The program product includes the program itself and a recording medium in which the program is recorded.

It is noted that the embodiments disclosed herein are merely illustrative in all aspects and should not be recognized as being restrictive. The scope of the present invention is defined not by the above description but by the scope of the claims, and is intended to include meaning equivalent to the scope of the claims and all modifications within the scope.

REFERENCE SIGNS LIST 1 vehicle
2 wide-area communication network
4 in-vehicle network
5 management server
6 DL server
7 user interface device
10 gateway (relay apparatus)
15 wireless communication unit
16, 16A, 16B in-vehicle communication line
11 CPU
12 RAM
13 storage unit
14 in-vehicle communication unit
30 ECU (on-vehicle control device)
31 CPU
32 RAM
33 storage unit
34 communication unit
35 start-up unit
51 CPU
52 ROM
53 RAM
54 storage unit
55 communication unit
111 calculation unit
112 DL control unit (transfer control unit)

The invention claimed is:

1. A relay apparatus configured to relay an update program for a control program of an on-vehicle control device, the relay apparatus comprising:
an in-vehicle communication unit connected to the on-vehicle control device via an in-vehicle communication line, and configured to transfer the update program, which is downloaded from a server, to the on-vehicle control device;
a calculation unit configured to calculate an index value indicating a proportion of a size of the update program to a size of the control program, and
a transfer control unit configured to start transfer of the update program to the on-vehicle control device when the index value is equal to or smaller than a threshold value, and not start the transfer when the index value is greater than the threshold value; wherein
in a case where the index value is greater than the threshold value, the transfer control unit changes the threshold value according to operation states of one or a plurality of on-vehicle control devices connected to the in-vehicle communication line, and again determines whether or not to permit the transfer, during a period in which the update program satisfies a predetermined condition for suspension.

2. The relay apparatus according to claim 1, wherein the transfer control unit changes the threshold value in accordance with an available bandwidth of the in-vehicle communication line.

3. The relay apparatus according to claim 1, wherein the operation states include a traveling speed of a vehicle on which the on-vehicle control device is mounted.

4. The relay apparatus according to claim 1, wherein the on-vehicle control device includes a control device for a user interface device, and
in a case where the transfer control unit does not permit the transfer, the transfer control unit outputs, to the control device, a control signal that causes the user interface device to make a notification that the transfer is not permitted.

5. The relay apparatus according to claim 1, wherein only in a case where the transfer control unit permits the transfer to the on-vehicle control device, the transfer control unit starts a download request to the server.

6. A method for relaying an update program for a control program of an on-vehicle control device, the method comprising:
transferring the update program, which is downloaded from a server, to the on-vehicle control device;
calculating an index value indicating a proportion of a size of the update program to a size of the control program;
starting transfer of the update program to the on-vehicle control device when the index value is equal to or smaller than a threshold value, and not starting the transfer when the index value is greater than the threshold value; and
in a case where the index value is greater than the threshold value, changing the threshold value according to operation states of one or a plurality of on-vehicle control devices connected to an in-vehicle communication line, and again determining whether or not to permit the transfer, during a period in which the update program satisfies a predetermined condition for suspension.

7. A non-transitory computer readable storage medium storing a computer program for causing a computer to function as a relay apparatus configured to relay an update program for a control program of an on-vehicle control device,
the computer program causing the computer to function as:
an in-vehicle communication unit connected to the on-vehicle control device via an in-vehicle communication line, and configured to transfer the update program, which is downloaded from a server, to the on-vehicle control device;
a calculation unit configured to calculate an index value indicating a proportion of a size of the update program to a size of the control program, and
a transfer control unit configured to start transfer of the update program to the on-vehicle control device when the index value is equal to or smaller than a threshold value, and not start the transfer when the index value is greater than the threshold value; wherein
in a case where the index value is greater than the threshold value, the transfer control unit changes the threshold value according to operation states of one or a plurality of on-vehicle control devices connected to the in-vehicle communication line, and again determines whether or not to permit the transfer, during a period in which the update program satisfies a predetermined condition for suspension.

* * * * *